Figure 1:
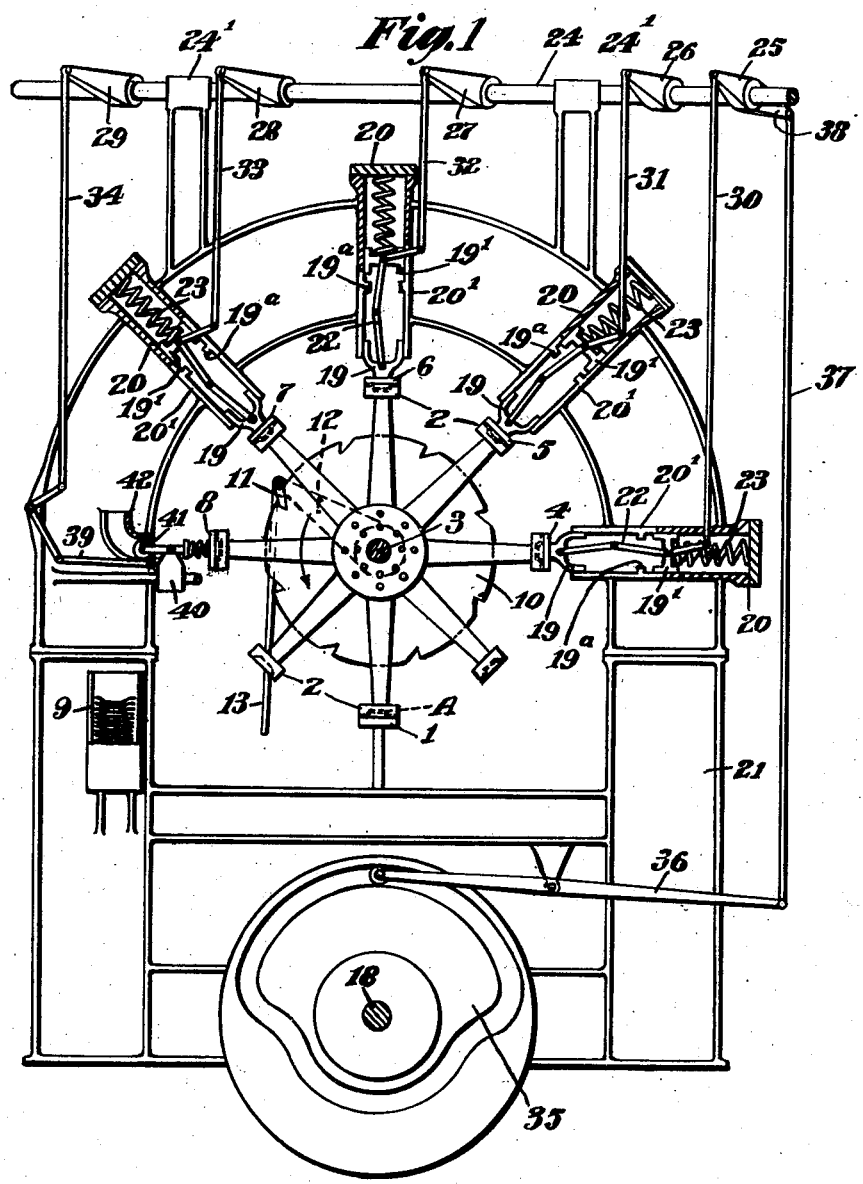

Oct. 8, 1935.  W. H. RANDALL  2,017,017
APPARATUS FOR DRYING MOLDED PULP ARTICLES
Filed Aug. 31, 1931  2 Sheets-Sheet 1

Inventor
Walter H. Randall
By Ellis Spear Jr.
Attorney

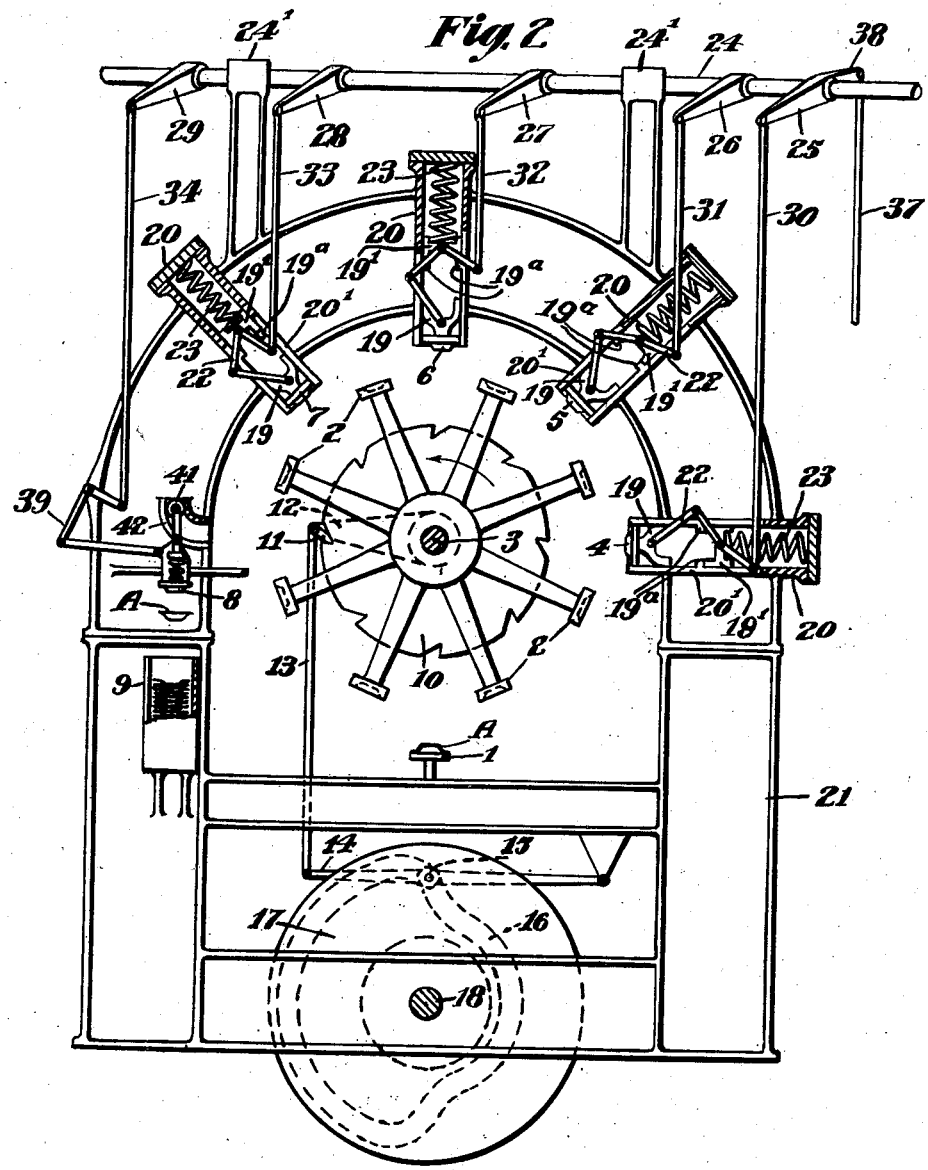

Patented Oct. 8, 1935

2,017,017

UNITED STATES PATENT OFFICE 2,017,017

APPARATUS FOR DRYING MOLDED PULP ARTICLES

Walter H. Randall, Waterville, Maine, assignor, by mesne assignments, to The Canal National Bank of Portland, Portland, Maine, a national banking association Application August 31, 1931, Serial No. 560,433

9 Claims. (Cl. 34—12)

This invention relates to machines and methods for drying molded pulp articles, such as plates, dishes or other containers.

Such articles, when formed, are usually removed from the forming dies for purposes of drying. It has been proposed heretofore, however, to die-dry such articles, i. e. to dry them either on the forming die itself or on a transfer die.

My present invention is directed broadly to drying on dies but involves certain new concepts whereby the formed article may be more efficiently dried than heretofore. More specifically my present invention contemplates a varying application of the drying heat to the articles during their travel through the drying orbit.

For some articles and under certain conditions, it is advantageous to first subject the articles to a heat application which progressively increases in intensity during the early part of the drying orbit and afterwards progressively decreases in intensity as the articles become dryer. For other articles and under other conditions, it is sufficient that the heat application shall simply progressively decrease in intensity progressively as the moisture content of the article decreases, that is to say, the article when wettest receives its most intense heat application, and such intensity progressively decreases as the moisture is removed.

In this, several factors are involved, production and saleability of the article being determining. The machine must be capable of operating at sufficient speed to fill production requirements. This means obviously that there is a definite limit to the time in which the articles may remain on the dies for drainage and drying. The intensity of the heat application must not be so high as to char the articles and yet must be high enough to dry them to the desired degree in the minimum time. The moisture given off by the drying article must also be effectively withdrawn as it is given off so as to shorten the drying time and reduce the drying heat.

As illustrative of the principles involved, I have shown somewhat diagrammatically in the accompanying drawings a method of drying on dies and a machine for the practice of my method which I have found highly satisfactory under actual service conditions.

In these drawings:—

Fig. 1 is a schematic view, partly in section, of a machine in accordance with my present invention, and Fig. 2 is a similar view showing the parts in an intermediate position.

I have indicated at 1 a die which for the purposes of this application may be considered to be a forming die on which the articles A are successively formed. The die 1 may move through any desired path, here shown as a sliding rectilinear path, relative to a radial assembly of vacuum dies 2 which intermittently rotate about a fixed axis 3.

As contemplated herein, when the forming die 1 is in position to have the formed article A thereon transferred therefrom to the vacuum dies 2, i. e., when said forming die is approaching the upper limit of its stroke (Fig. 1) the vacuum die series is paused with one of the vacuum dies in alinement with the forming die.

As the forming die continues its rise, the formed article thereon is transferred to such vacuum die on which it remains for the greater part of the orbit of such die, being subjected at subsequent stages in the orbit to successive heat applications whereby to dry the article.

Such heat applications are made by means of a spaced series of heated drying dies 4, 5, 6 and 7 arranged about the orbit of the vacuum dies and movable into timed contact with the formed articles on said vacuum dies as said vacuum dies pause in alinement with said drying dies.

Under some conditions and with certain materials, the first drying die 4 to contact the wet article is a relatively hot die but one or more of the succeeding dies, are increasingly hotter, so that the article is subjected to a progressively increasing heat application during its early travel through the drying orbit. With such an arrangement, however, it is preferable that the remaining dies in the latter part of the drying orbit, for example, shall be of progressively decreasing heat intensity so as not to burn or char the article after its moisture content has thus rapidly been reduced during the earlier part of the drying orbit. Such an arrangement is not only economical but also gives a better finish to the article, especially where the material of the article is almost entirely ground wood pulp.

Under other conditions and with other materials, it is advantageous that the first drying die 4 to contact the article shall be the hottest die, the succeeding dies 5, 6 and 7 in the series progressively diminishing in heat intensity accordingly as the moisture content of the article is reduced.

Beyond the series of heated drying dies, is an ejector die 8 which functions successively to remove the dried articles from the vacuum dies and deposit them upon some take-off device, as a belt or stack, here shown as a stack 9.

The intermittent rotation of the series of vacuum dies 2 may be accomplished in any desired manner. As here shown it is accomplished by means of a toothed stepping wheel 10 fast on the same shaft 3 which carries the radial assembly of vacuum dies 2 and actuated in properly timed relation to the other operating elements of the machine by means of a pawl 11 on a pawl carrying arm 12, a pull rod 13 and a cam lever 14 having a cam roll 15, operating in the cam track 16 of a cam 17 fast on a cam shaft 18. (See Fig. 2.)

The series of heated drying dies 4, 5, 6 and 7 may be heated in any suitable manner, and are preferably electrically heated. They are mounted for radial movement towards and away from the vacuum dies 2, being moved into contact with the articles on said vacuum dies at the moment that said vacuum dies are alined with said drying dies and paused in their step by step travel relative thereto.

This may be accomplished in any suitable manner and as here shown is accomplished by slidably mounting the drying dies on sliding carriers 19 which slide in fixed slideways 20 mounted at suitably spaced intervals about the frame 21 of the machine, said slideways being longitudinally slotted as indicated at 20'. The reciprocation of the heated drying dies towards and from the vacuum dies 2 in properly timed relation to the stepping movement of the vacuum dies may conveniently be accomplished by means of toggles 22.

The toggles 22 are all actuated from a common rocker shaft 24 journaled in suitable bearings 24' extending from the frame of the machine, through individual rocker arms 25, 26, 27, 28 and 29, which are individually linked as at 30, 31, 32, 33 and 34 to slidable compression blocks 19' which slide in said slideways against the action of the compression springs 23. The rocker shaft 24 itself is actuated from a cam 35 (Fig. 1) mounted on the cam shaft 18 through suitable motion transmitting connections including a cam lever 36, a link 37, and a rocker arm 38 on said rocker shaft.

In the operation of closing the heated dies on the vacuum dies, the rocker shaft is actuated to straighten the toggles 22 until the heating dies seat themselves on the articles held on the vacuum dies. This occurs while the vacuum dies are paused in alinement with the heated dies. The stroke of the rocker shaft continues somewhat so as to lift the compresison blocks 19 thereby compressing the springs 23 to maintain an even pressure on the heated drying dies at all times during the closure of the dies.

In the opening of the dies the reverse action takes place. The first part of the toggle stroke allows the compression blocks 19 to drop against suitable stop blocks 19ª where they remain during the time in which the heated drying dies are opened or separated from the vacuum dies. After the compression blocks 19 take up against the stop blocks 19ª the continuation of the toggle stroke draws the die carriers 19 back to a degree determined by the stroke of the rocker shaft. The stop blocks 19ª are fixed at all times being integral with the fixed slideways 20.

The drying period as represented by the closure of the heated dies on the vacuum dies may be any desired period but for practical reasons is a relatively short period, sufficient drying time being provided by arranging a sufficient number of drying dies about the orbit of the vacuum dies rather than by attempting to maintain said dies and the drying dies together for any appreciable length of time. During such drying period, however, the vacuum through the dies 2 withdraws the moisture released from the formed articles by reason of such contact with the heated drying dies.

The ejector die 8 is arranged at the end of the drying orbit and successively removes the dried article from the vacuum dies and transfers them to any suitable take-off device, as a conveyor or as here shown the stack 9. The ejector die 8 is therefore mounted to swing through an arc of approximately 90° (c. f. Figs. 1 and 2.)

The motion transmitting connections by means of which such movement is imparted to this die include a toggle lever 39 connected to a slide 40 to which the die 8 is pivoted and a cam roll 41 and a cam track 43, the arrangement being such that the die 8 first swings into contact with the dried article on that die of the series of vacuum dies 2 which happens to be alined therewith when the vacuum die series is paused in its intermittent rotation (see Fig. 1), transfers the dried article to itself, and thereafter swings into position to discharge the dried article into the stack 9 while the vacuum dies are in rotation, as illustrated in Fig. 2.

Various modifications in method and machine may obviously be resorted to within the spirit and scope of my inveniton, as defined by the appended claims.

What I therefore claim and desire to secure by Letters Patent is:—

1. Apparatus for die-drying a molded pulp article, comprising an intermittently moving vacuum die on which the article to be dried is held and an intermittently reciprocating drying die adapted to contact the article held on said vacuum die, timed means for relatively moving said dies to effect such contact, an intermittently swinging die for thereafter removing the dried article from said vacuum die, and means for swinging said swinging die in timed relation to the operation of said vacuum and drying dies.

2. Apparatus for die-drying molded pulp articles, comprising an intermittently movable series of vacuum dies on which the articles to be dried are held, means for intermittently rotating said dies, a series of heated drying dies arranged adjacent said vacuum dies, means operating in timed relation to the movement of said vacuum dies for simultaneously moving said drying dies into contact with the articles on said vacuum dies when said vacuum dies are paused in their movement opposite said drying dies, and means for successively removing the dried articles from said vacuum dies at the completion of the drying cycle.

3. Apparatus for die-drying molded pulp articles, comprising an intermittently movable series of vacuum dies on which the articles to be dried are held, means for intermittently moving said dies, a series of heated drying dies of progressively varying heat intensity arranged adjacent said vacuum dies, means operating in timed relation to the movement of said vacuum dies for simultaneously moving said drying dies into contact with the articles on said vacuum dies when said vacuum dies are paused in their movement opposite said drying dies, and means for successively removing the dried articles from said vacuum dies at the completion of the drying cycle.

4. Apparatus for die-drying molded pulp articles, comprising an intermittently rotatable series of vacuum dies on which the articles to be dried are held, means for intermittently rotating said vacuum dies including a toothed stepping wheel, a stepping pawl, a cam shaft, a cam thereon, and operative connections from said cam to said pawl, a series of heated drying dies arranged about the orbit of said vacuum dies, and means timed to the operation of said vacuum dies for simultaneously moving said drying dies into contact with the articles on said vacuum dies when said vacuum dies are paused in their rotation opposite said drying dies.

5. Apparatus for die-drying molded pulp articles, comprising an intermittently rotatable series of vacuum dies on which the articles to be dried are held, means for intermittently rotating said vacuum dies including a toothed stepping wheel, a stepping pawl, a cam shaft, a cam thereon, and operative connections from said cam to said pawl, a series of heated drying dies arranged about the orbit of said vacuum dies, and means timed to the operation of said vacuum dies for simultaneously moving said drying dies into contact with the articles on said vacuum dies when said vacuum dies are paused in their rotation opposite said drying dies, including sliding carriers for said drying dies, and toggles for reciprocating said die carriers.

6. Apparatus for die-drying molded pulp articles, comprising an intermittently movable series of outwardly facing vacuum dies on which the articles to be dried are held, means for intermittently moving said vacuum dies, a series of inwardly facing heated drying dies arranged adjacent said vacuum dies, means for simultaneously moving said drying dies into contact with the articles on said vacuum dies when said vacuum dies are paused in their movement opposite said drying dies, including sliding carriers for said drying dies, toggles for reciprocating said die carriers, and a common rocker shaft operatively connected with said toggles, means for rocking said rocker shaft in timed relation to the intermittent movement of said vacuum dies including a cam shaft, a cam thereon, and motion transmitting connections between said cam and said rocker shaft, and means for successively removing the dried articles from said vacuum dies at the completion of the drying cycle.

7. Apparatus for die-drying molded pulp articles, comprising an intermittently movable series of outwardly facing vacuum dies on which the articles to be dried are held, means for intermittently moving said vacuum dies, a series of inwardly facing heated drying dies arranged adjacent said vacuum dies, means for simultaneously moving said drying dies into contact with the articles on said vacuum dies when said vacuum dies are paused in their movement opposite said drying dies, including sliding carriers for said drying dies, toggles for reciprocating said die carriers, and a common rocker shaft operatively connected with said toggles, means for rocking said rocker shaft in timed relation to the intermittent movement of said vacuum dies including a cam shaft, a cam thereon, and motion transmitting connections between said cam and said rocker shaft, and means for successively removing the dried articles from said vacuum dies at the completion of the drying cycle, comprising a swinging ejector die, and motion transmitting connections thereto from said rocker shaft for operating the same in timed relation to the operation of said vacuum and drying dies.

8. Apparatus for die-drying individually molded pulp articles which have been die-molded from an aqueous pulp solution on a foraminous forming die and are presented by said die as a partially drained wet layer of pulp, comprising an intermittently moving series of vacuum holding dies onto which the individually formed articles are successively transferred while wet from said forming die, a series of intermittently movable heated drying dies disposed adjacent said holding dies, means for moving said drying dies repeatedly as a unit into such contact with the formed articles on said holding dies as to dry but not to remove the articles from the holding dies while the holding dies are paused as a unit in alinement with said drying dies, and means whereby vacuum may be maintained on said holding dies throughout a substantial portion of their travel whereby both to retain the articles on said holding dies and to exhaust the moisture given off by the wet articles as they are contacted by said heated drying dies.

9. Apparatus as claimed in claim 8, wherein the drying dies are disposed radially about the holding dies and are intermittently reciprocable into and out of the path of said holding dies in timed relation to the intermittent movement thereof.

WALTER H. RANDALL.